United States Patent [19]

Tovey

[11] Patent Number: 4,647,448

[45] Date of Patent: Mar. 3, 1987

[54] PHARMACEUTICAL DOSAGE UNIT

[75] Inventor: Geoffrey D. Tovey, Harpenden, England

[73] Assignee: Smith Kline & French Laboratories Limited, Welwyn Garden City, England

[21] Appl. No.: 684,829

[22] Filed: Dec. 21, 1984

[30] Foreign Application Priority Data

Jun. 22, 1984 [GB] United Kingdom ............... 8416034

[51] Int. Cl.[4] ............................................. A61K 9/20
[52] U.S. Cl. ................................. 424/467; 514/948; 424/435; 424/468
[58] Field of Search ................. 424/145, 15; 514/948

[56] References Cited

U.S. PATENT DOCUMENTS

| D. 202,467 | 10/1965 | Guilmot | 424/15 |
| 208,883 | 10/1878 | Berlin | 424/15 |
| D. 220,956 | 6/1971 | Roberts | 424/15 |
| 739,317 | 9/1903 | Jenkins | 424/15 |
| 3,113,076 | 12/1963 | Jacobs | 424/15 |
| 3,279,995 | 10/1966 | Reid | 424/15 |
| 3,429,308 | 2/1969 | Russell | 424/14 |
| 3,443,563 | 5/1969 | Ishihama et al. | 424/14 |
| 3,444,858 | 5/1969 | Russell | 424/15 |
| 3,723,614 | 3/1973 | Langauer | 424/15 |
| 3,763,861 | 10/1973 | Forti et al. | 424/16 |

FOREIGN PATENT DOCUMENTS 993291 5/1965 United Kingdom ................ 424/15

OTHER PUBLICATIONS

McClintic Basic Anatomy and Physiology of the Human Body, Second Edition, 1975 pp. 389-371.
Ganong Review of Medical Physiology, Eleventh Edition, 1983, pp. 143-144.

Primary Examiner—Shep K. Rose
Attorney, Agent, or Firm—Joseph A. Marlino; Stuart R. Suter; Alan D. Lourie

[57] ABSTRACT

The invention describes a pharmaceutical dosage unit suitable for oral administration with at least one face having a recess, which recess extends from one edge across and into the face; the recess being so shaped as to accommodate at least the tip of the user's tongue.

4 Claims, 5 Drawing Figures

PHARMACEUTICAL DOSAGE UNIT

This invention relates to a pharmaceutical dosage unit suitable for oral administration and which is intended to be sucked or chewed.

For some medicaments it is essential and for others it is preferable that they should be released gradually into the mouth. Examples are medicaments that are buccally absorbed and medicaments for the treatment of the upper alimentary tract and the upper part of the respiratory system.

A pharmaceutical dosage unit has been invented which is so shaped as to accommodate the tip of the tongue so that it can be held more securely against the palate towards the front of the mouth.

Accordingly the present invention provides a pharmaceutical dosage unit suitable for oral administration with at least one face having a recess, which recess extends from one edge across and into the face; the recess being so shaped as to accommodate at least the tip of the user's tongue.

A particular benefit arising from this advantage is that the shape can be used to reduce the unpleasantness of the oral administration of substances having a bitter taste. Sweet and bitter tastes are perceived by receptors on different parts of the tongue. The sweet receptors are towards the front of the tongue. The bitter receptors are to the rear. If a unit contains a bitter substance a diminution of the unpleasant taste can be achieved by keeping the dosage unit containing it away from the bitter receptors.

Examples of medicaments that can be formulated in the units of the present invention are antibiotics and antiseptics for the treatment of infections of the mouth and throat, for example tyrothricin and cetylpyridinium chloride; analgesic and local anaesthetics, for example benzocaine; anti-tussive agents for example dextromethorphan; medicaments for the treatment of hyperacidity and dyspepsia for example antacids especially aluminium hydroxide and magnesium carbonate and $H_2$-antagonists, especially cimetidine.

The face having the recess will in general be flat. In this case the plane of the face is a plane of the surface. Where the face is not flat, the plane of the face is taken as the plane of maximum contact with the face where it is concave or a tangent to the face at the centre of the recess where it is convex.

The recess can be in an otherwise continuous face. Alternatively, the face may be cut away beyond the recess leaving walls which define the recess.

Preferably the recess deepens as it crosses the face of the unit and its widest point is towards the one edge from which it extends.

The recess can be in any shape which can accommodate the tongue. For example in cross-section, it can be rectangular, semi-circular or parabaloid. Preferably it is tongue-shaped.

The length of the recess, that is to say the distance from the edge to its furthest point is in practice not less than 7 mm and not greater than 20 mm.

The width of the recess at its widest point is in practice not less than 7 mm and not more than 20 mm.

In practice the minimum value for the maximum depth of the recess is 0.9 mm and the maximum value for the maximum depth is 3 mm.

Preferably the recess is 15 mm long, the width at the widest point is 15 mm and the depth at the deepest point is 2.3 mm.

The overall size of the unit is to be such that it can be accommodated whole in the mouth.

The overall length of the unit (that is to say the longest extent of the unit in the direction of a plane parallel to the face) is, in practice, no more than 35 mm. In practice also the minimum length is 9 mm. A convenient length is 19.5 mm.

The maximum depth of the unit, that is to say the perpendicular distance between the two faces is, in practice, no more than 10 mm. In practice a minimum depth is 2 mm. A convenient depth is 5 mm.

The maximum width of the unit that is to say the maximum extent on the plane of the face and in a direction perpendicular to the length and height is, in practice, 35 mm. In practice a minimum width is 9 mm. A convenient width is 19 mm.

The ratio of the length of the unit to its width is at most 3:2. Preferably it is 1:1.

The possible ratios of the depth of the unit to its length are fixed by the maximum size which can be conveniently accommodated in the mouth. In practical terms the maximum depth of a unit is of the order of 10 mm. For this depth, the ratio of the depth to the length can be from 1:1 to 1:3.5.

The greatest length for a unit to be conveniently accommodated in the mouth is in practice 35 mm. At the greatest length, the ratio of the depth to length is from 1:7 to 1:3.5.

Within the limits that the length of the unit is in practice not less than 9 mm and not greater than 35 mm and the depth of the unit is not less than 2 mm and not greater than 10 mm, a convenient ratio of depth to length to width is 1:4:4.

The ratio of the length of the recess to the length of the unit can be from 3:4 to 1:3. Preferably it is 2:3.

The ratio of the width of the recess at its widest point to the width of the unit can be from 1:1 to 1:3. Preferably it is 2:3.

The ratio of the depth of the recess to the depth of the tablet can be for example 1:8 to approximately 1:2.1.

The unit can have any shape in cross-section adopted in pharmaceutical dosage units. For example, the cross-section can be circular as in the conventional circular tablet, or it can be triangular, rectangular, pentagonal or hexagonal. In particular it is rectangular.

Where the unit is circular in cross-section and has a flat upper and lower face, the length of the unit is one diameter and the width of the unit is a diameter at right angles.

Where the unit is triangular in cross-section and has flat faces, the length of the unit is the perpendicular height of the triangular face in the direction of the recess. The width of the unit is the length of the base of the triangular face.

Where the unit is rectangular in cross-section, and has flat faces, the length of the unit length of the side in the direction of the recess and the width is the length of a side perpendicular to the length.

Where the unit is pentagonal or hexagonal in cross-section, with flat faces, the length of the unit is the maximum extent across the face in the direction of the recess. The width is the maximum extent across the unit in a direction perpendicular to the length and in the plane of the face.

The unit can have a recess in one face only. Preferably the unit has a second face on the side of the unit opposite to the one face and this second face also has a recess as described above.

The unit can be, for example, a tablet, pastel or lozenge. It can be manufactured by standard methods, for example, by compression or moulding.

One embodiment of a tablet according to the invention will now be described with reference to the drawings where:

Figure 1:
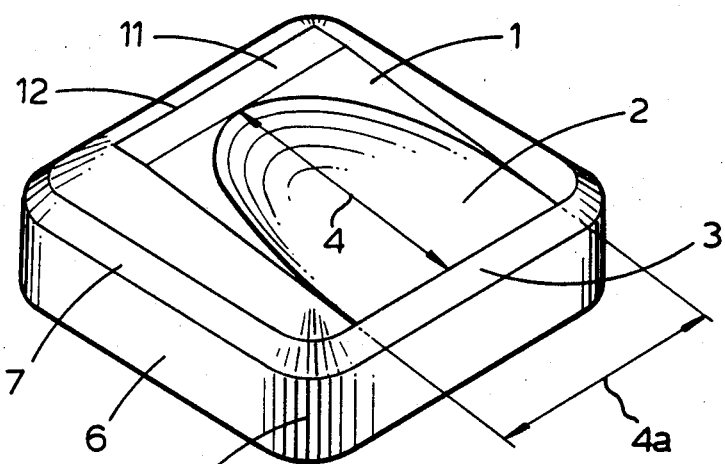
FIG. 1 is a perspective view of a unit of this invention from one side.
Figure 2:
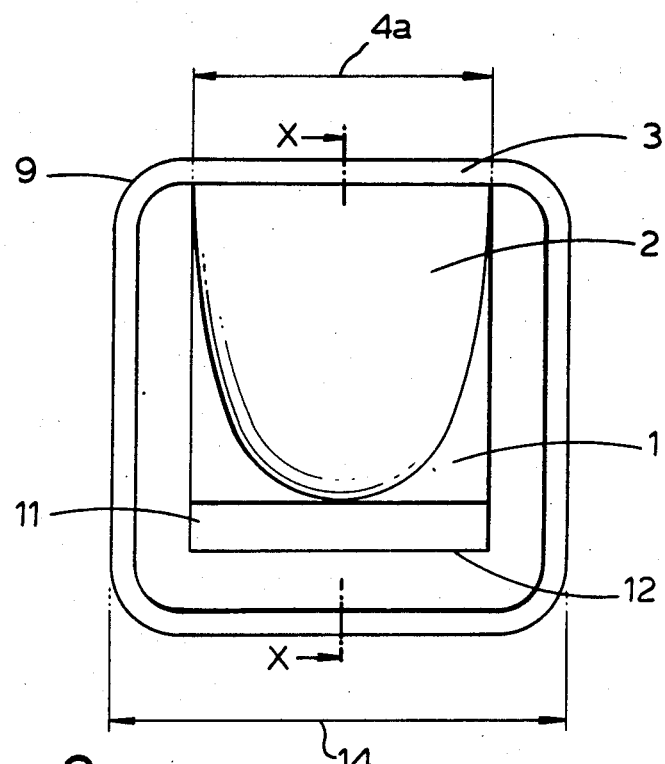
FIG. 2 is a plan view of the unit of FIG. 1.
Figure 3:
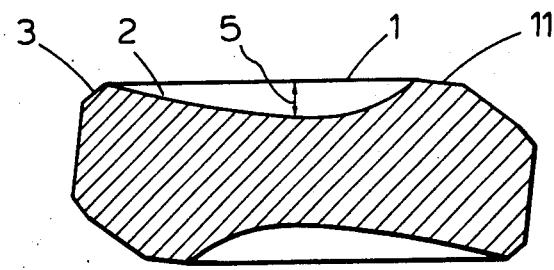
FIG. 3 is a cross-section on X—X of FIG. 2.
Figure 4:
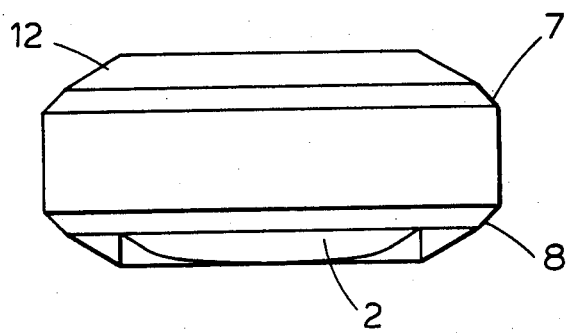
FIG. 4 is a rear elevation of the unit of FIGS. 1 to 3.
Figure 5:
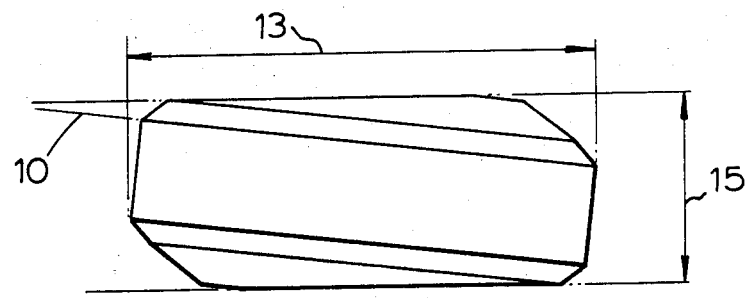
FIG. 5 is an elevation of the unit from the side opposite that in FIG. 1.

With reference to the drawings, the unit comprises a face 1 having a recess 2 which recess extends from one edge 3 across and into the face. The recess is shaped so as to accommodate at least the tip of the user's tongue.

In this embodiment, the recess is tongue-shaped in cross-section. The length 4 of the recess from chamfer to its furthest point is 15 mm. The width of the recess at its widest point 4a is 15 mm. The depth 5 of the recess at its deepest point is 3 mm.

The unit has side walls 6 which define a main body. In plan view the main body is essentially rectangular in appearance. The upper and lower edges 7 and 8 of the walls are chamfered and the corners (for example 9) are rounded. The face 1 is inclined at an angle of 7° with a plane 10 perpendicular to the side walls.

The face extends across the unit from one chamfered edge 3 and terminates in an oblong facet 11. The longest side 12 of the facet is as long as the maximum width 5 of the recess and falls away from the face at an angle of 37° to the face 1. Beyond this facet and on the two adjacent sides of the recess, the face is cut away and the surface of this cut away portion merges with the chamfered edge 7.

The length 13 of the unit is 19.5 mm. The width 14 of the unit is 19 mm and the depth 15 of the unit is 5 mm.

In this embodiment the unit is a tablet. It can be manufactured by mixing the active ingredient with an excipient and compressing the mixture with a complementary shaped punch and die.

In use the recess 2 can receive the tip of the tongue and can be held by the tongue against the pallet towards the front of the mouth.

I claim:

1. A pharmaceutical dosage unit containing bitter tasting medicaments for oral administration comprising at least one face having a recess which extends from one edge of the unit into the face, said recess deepening as it crosses the face and having its widest point towards the edge from which it extends, said unit being from about 9 mm to about 35 mm in length, from about 2 mm to about 10 mm in depth, from about 9 mm to about 35 mm in width and said recess being from about 7 mm to about 20 mm in length and width and from about 0.9 mm to about 3 mm in depth and adapted to receive the tip of the tongue and hold said unit against the palate thereby keeping said bitter tasting medicaments away from the bitter receptors on the rear of the tongue.

2. A unit according to claim 1 where the recess is tongue-shaped.

3. A unit according to claim 1 having on the side opposite to the one face a second face having a recess as defined in claim 1.

4. A unit according to claim 1 which is rectangular in cross-section.

* * * * *